United States Patent
Jourdain

(10) Patent No.: US 9,382,412 B2
(45) Date of Patent: Jul. 5, 2016

(54) FOAMED COMPOSITIONS COMPRISING PROPYLENE-BASED ELASTOMERS, ARTICLES MADE THEREFROM, AND METHODS OF MAKING THE SAME

(71) Applicant: ExxonMobil Chemical Patents Inc., Baytown, TX (US)

(72) Inventor: Eric P. Jourdain, Rhode Saint Genese (BE)

(73) Assignee: ExxonMobil Chemicals Patents Inc., Baytown, TX (US)

(*) Notice: Subject to any disclaimer, the term of this patent is extended or adjusted under 35 U.S.C. 154(b) by 197 days.

(21) Appl. No.: 13/891,376

(22) Filed: May 10, 2013

(65) Prior Publication Data

US 2014/0336290 A1    Nov. 13, 2014

(51) Int. Cl.
- *C08J 9/00* (2006.01)
- *C08L 23/16* (2006.01)
- *C08J 9/10* (2006.01)

(52) U.S. Cl.
CPC ............... *C08L 23/16* (2013.01); *C08J 9/0061* (2013.01); *C08J 9/105* (2013.01); *C08J 2201/026* (2013.01); *C08J 2201/03* (2013.01); *C08J 2203/04* (2013.01); *C08J 2300/26* (2013.01); *C08J 2323/16* (2013.01); *C08J 2400/26* (2013.01); *C08J 2423/16* (2013.01); *C08L 2203/14* (2013.01)

(58) Field of Classification Search
CPC .... C08J 9/0061; C08J 9/105; C08J 2201/026; C08J 2201/03; C08J 2203/04; C08J 2300/26; C08J 2323/16; C08J 2400/26; C08J 2423/16; C08L 23/16; C08L 2203/14

See application file for complete search history.

(56) References Cited

U.S. PATENT DOCUMENTS

| | | | |
|---|---|---|---|
| 6,433,090 B1 * | 8/2002 | Ellul et al. ............... | 525/191 |
| 6,713,520 B2 * | 3/2004 | Sahnoune et al. ........ | 521/53 |
| 7,319,121 B2 | 1/2008 | Jacob | |
| 7,326,471 B2 | 2/2008 | Shaw | |
| 8,101,254 B2 | 1/2012 | Noguchi et al. | |
| 8,205,391 B2 | 6/2012 | Aritake et al. | |
| 8,227,547 B2 | 7/2012 | Jiang et al. | |
| 8,353,130 B2 | 1/2013 | Fukuta et al. | |
| 2004/0001942 A1 | 1/2004 | Sahnoune et al. | |
| 2009/0247656 A1 | 10/2009 | Jacob et al. | |
| 2011/0135909 A1 | 6/2011 | Iwase et al. | |
| 2011/0160323 A1 | 6/2011 | Liang et al. | |
| 2012/0059123 A1 | 3/2012 | Nakano | |

OTHER PUBLICATIONS

Exxon Mobile Chemical Grades and Datashhets, Vistalon. Sep. 2010.*
Application No. PCT/CN2012/000292, titled, "Compositions Comprising EPDM and a Polyolefin Elastomer, Methods of Making the Same and Articles Made Therefrom", filed on Mar. 9, 2012.
U.S. Appl. No. 13/281,076, titled, "Composition, Foam and Article Made Therefrom," filed Oct. 25, 2011.

* cited by examiner

*Primary Examiner* — Irina S Zemel
(74) *Attorney, Agent, or Firm* — Stephen A. Baehl

(57) ABSTRACT

Provided are compositions comprising a propylene-based elastomer and foamed profiles comprising said compositions. The presence of the propylene-based elastomer can provide foamed profiles with reduced density while maintaining properties including compression set and compression load deflection at a level comparable to those of conventional EPDM foams.

14 Claims, 11 Drawing Sheets

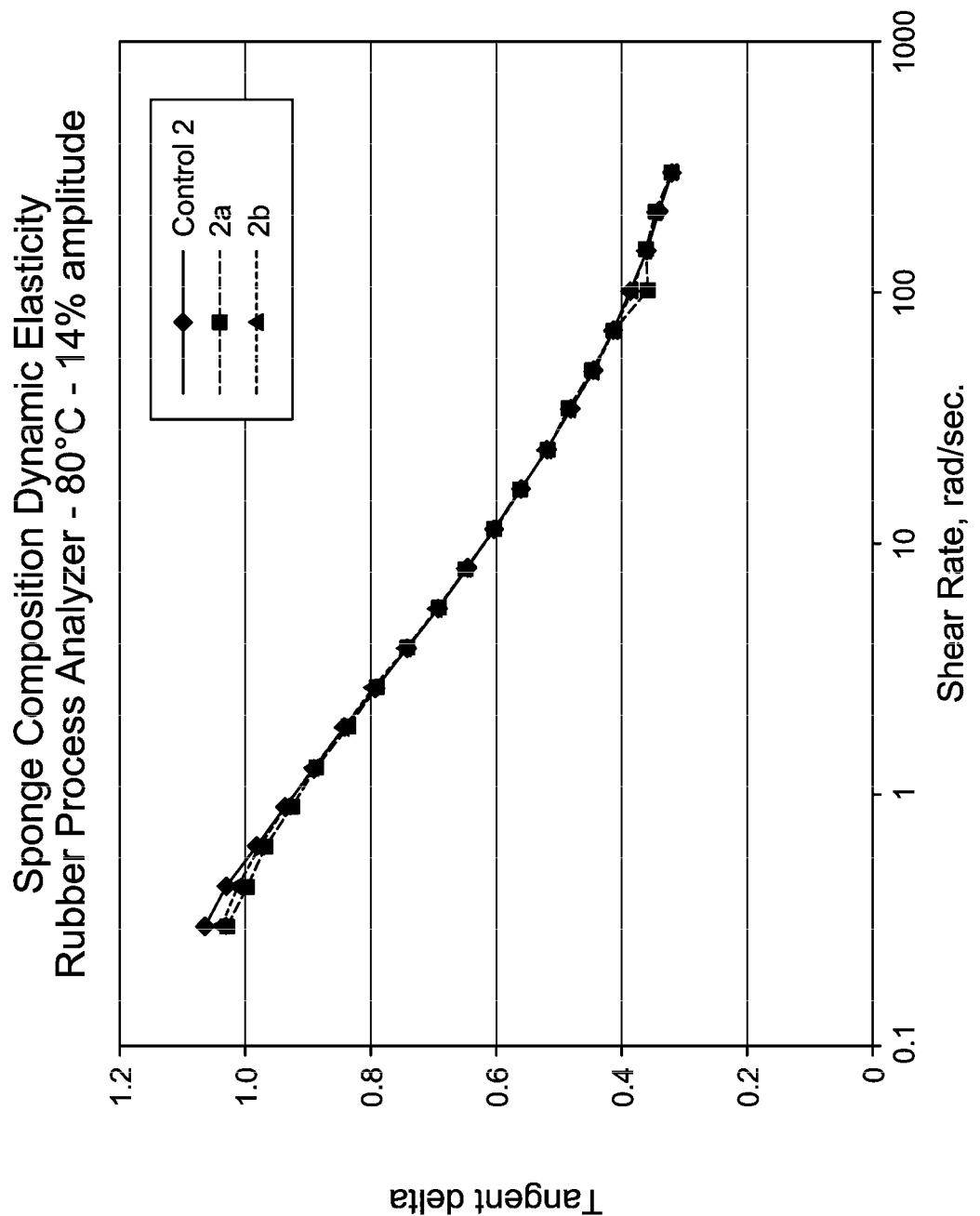

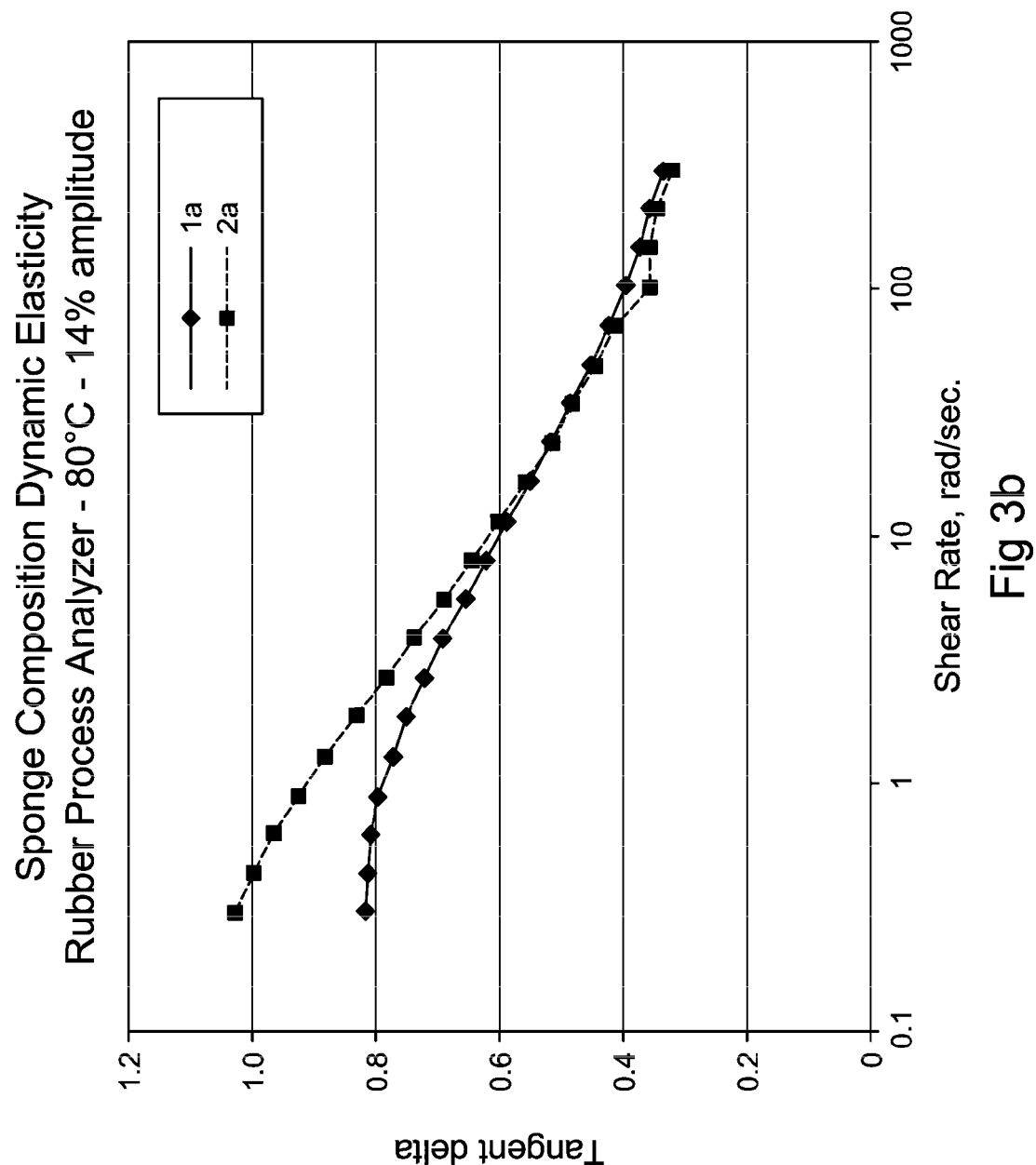

FOAMED COMPOSITIONS COMPRISING PROPYLENE-BASED ELASTOMERS, ARTICLES MADE THEREFROM, AND METHODS OF MAKING THE SAME

FIELD OF THE INVENTION

This invention relates to compositions comprising a propylene-based elastomer, and in particular foamed compositions comprising propylene-based elastomers, articles made therefrom, and methods of making the same.

BACKGROUND OF THE INVENTION

Ethylene/α-olefin/non-conjugated polyene copolymer rubbers, such as ethylene-propylene-diene copolymers ("EPDM"), have outstanding performance in terms of weatherability, heat resistance and ozone resistance. As a result, rubber compositions containing such copolymer rubbers, crosslinked products of the compositions, and foamed products of the compositions have been broadly used for automotive parts, industrial rubber articles, electrically insulating materials, civil engineering and construction materials. Specifically, EPDM foams (sponges) obtained by vulcanizing and foaming an EPDM rubber have been used as sealing material for a variety of industrial products.

For automobiles, sealants sealing between car body opening peripheries, and opening/closing members for openings such as doors and trunk lids are used to prevent rain, wind and sounds from the outside. The sealants commonly include a solid member attached to door frames, trunk lids, car body opening peripheries and the like, and a foamed member to seal gaps between car body opening peripheries, and opening/closing members for openings. The foamed member is required to be deformable to conform to irregularities and curved shapes of door frames, trunk lids and the like, and to have a hardness which allows close contact with door frames, trunk lids and the like.

There is now a demand for weight reduction of automobiles and, in turn, weight reduction of EPDM foams used for automotive sealants. In order to manufacture EPDM foams with low density and high sealing performance, higher double-bond content (i.e., diene content) is generally required for faster curing and higher ultimate crosslink density for improved cellular foam structure and improved mechanical properties, such as compression set. However, higher diene levels can increase the cost of EPDM rubbers. Furthermore, interpolymers containing high levels of diene can result in cured formulations with shorter scorch times, which can lead to processing problems. It has also been studied that the density of EPDM foams can be lowered by raising the foaming ratio of the EPDM foams. However, an increase in the foaming ratio of the EPDM foams can undesirably affect a number of product properties, including compression set, compression load deflection, and tear resistance, which can negatively impact the sealing performance and service life of the automotive sealants made therefrom.

U.S. Pat. No. 8,353,130 discloses a door weather strip including an attaching base part and a hollow seal part. Both the attaching base part and the seal part are made of the same EPDM sponge rubber material by an extrusion process. The door weather strip has a specific gravity that is from 0.36 to 0.44, a low stretch stress of 200 kPa to 230 kPa, and an average foaming cell diameter of 180 µm to 220 µm.

U.S. Pat. No. 8,205,391 provides an automobile weather strip which has a trim part, which has an insert member and a covering material, and a sealing part. The covering material comprises a sponge material comprising a blend of an EPDM rubber and an olefin-based thermoplastic synthetic resin where the covering material has a specific gravity of 0.6 to 0.8 and a 25%-stretching stress of 500 KPa or more. The olefin-based thermoplastic synthetic resin is described as being a polyethylene resin, a polypropylene resin, or an ethylene/octane resin.

U.S. Pat. No. 8,101,254 relates to a molded product comprising a rubber composition that comprises an ethylene/α-olefin/non-conjugated polyene copolymer (A), and a polyolefin resin (B) having an Mn of not less than 10,000 and/or an ethylene/α-olefin copolymer (C) having Mn of 2500 to 5000.

U.S. Pat. No. 7,319,121 relates to foamed thermoplastic elastomer profiles comprising a foamable thermoplastic elastomer composition having a) a cross-linkable hydrocarbon rubber and b) a thermoplastic polyolefin resin having a Tm greater than 120° C. The composition further comprises: a) 25 to 30 wt % of a partially or fully vulcanized reaction product of said cross-linkable hydrocarbon rubber with a cross-linking agent, said reaction product being present as a dispersed phase; b) 7 to 12 wt % of said thermoplastic resin as a continuous phase; c) 8-22 wt % of an elastomeric thermoplastic modifier; and, optionally, d) 3-12 wt % solid filler; and/or e) 35-45 wt % of non-aromatic hydrocarbon oil; where the composition has been prepared by dynamically vulcanizing said composition.

U.S. Pat. No. 7,326,471 provides an automotive sealant composite structure that includes (i) a first piece comprising a first elastomeric component that includes an at least partially crosslinked rubber, a first olefinic thermoplastic resin component, and a second olefinic thermoplastic resin component, and (ii) a second piece comprising a second elastomeric component that comprises a thermoset ethylene copolymer rubber and an olefinic thermoplastic resin.

U.S. Publication No. 2012/0059123 discloses a copolymer rubber composition comprising 60 to 75% by weight of a copolymer rubber (1) that is an EPDM comprising 50 to 70 mol % ethylene units and 30 to 50 mol % of α-olefin units, and 40 to 25% by weight of a copolymer rubber (2) that is an ethylene-α-olefinic copolymer rubber comprising 70 to 95 mol % ethylene units and 5 to 30 mol % α-olefin units.

U.S. Publication No. 2011/0160323 provides a process for forming a shaped article comprising: (a) forming a polymeric admixture comprise of at least one ethylene/α-olefin/non-conjugated diene interpolymer, at least one sulfur-based curative or organic peroxide-based crosslinking agent, and, optionally, a process oil, carbon blacks, additional inorganic fillers, organic fillers, cure accelerators, and/or foaming agents; (b) shaping the resulting admixture; and (c) heating the resulting admixture to a temperature at least the decomposition temperature of the sulfur-based cure agent or the peroxide crosslinking agent.

U.S. Publication No. 2011/0135909 relates to an EPDM foam obtained by foaming an ethylene-propylene-diene rubber, 0.1 to 5 parts by weight of a vulcanizer, 0.1 to 10 parts by weight of a vulcanization accelerator, 1 to 30 parts by weight of a foaming agent, and a foaming auxiliary agent.

As discussed above, there remains a need for EPDM-based compositions for manufacturing foamed profiles with reduced density while maintaining properties including compression set and compression load deflection at a level comparable to those of conventional EPDM foams, so as to provide desirable sealing performance of final automotive sealants made therefrom with reduced weight. Applicants have found that the above objectives can be achieved by blending a propylene-based elastomer with EPDM to prepare a foamed profile, which can be used for manufacturing automotive sealants. Applicants have also found that the addition of the propylene-based elastomer can reduce the use of the foaming agent without compromising the foaming effects, thus further lowering the cost for automotive sealants.

SUMMARY OF THE INVENTION

Provided are compositions comprising a propylene-based elastomer, foamed profiles comprising said compositions, articles made therefrom, and methods of making the same.

The composition may comprise: (a) an ethylene-propylene-diene terpolymer; (b) a propylene-based elastomer having at least about 60 wt % propylene-derived units and about 5 to about 25 wt % ethylene-derived units, based on total weight of the propylene-based elastomer, and a heat of fusion of less than about 80 J/g; and (c) a foaming agent.

Also provided are methods for preparing a composition, comprising the steps of: (a) combining (i) an ethylene-propylene-diene terpolymer; (ii) a propylene-based elastomer having at least about 60 wt % propylene-derived units and about 5 to about 25 wt % ethylene-derived units, based on total weight of the propylene-based elastomer, and a heat of fusion of less than about 80 J/g; and (iii) a foaming agent; and (b) forming the composition.

Also provided are foamed profiles comprising any of the compositions described herein or made according to any method disclosed herein. Preferably, the foamed profile has a density (ASTM D792-08, 23° C.) at least about 5% lower than the density of a comparative profile sample. Seal articles comprising the foamed profile described herein are also provided.

BRIEF DESCRIPTION OF THE DRAWINGS

FIG. 1 compares Sample 1*a* to control Sample 1, with the dynamic viscosity illustrated in FIG. 1*a* and the elasticity in FIG. 1*b*. FIG. 2 compares Samples 2*a* and 2*b* with control Sample 2, with the dynamic viscosity illustrated in FIG. 2*a* and the elasticity in FIG. 2*b*. FIG. 3 compares Samples 1*a* and 2*a*, with the dynamic viscosity illustrated in FIG. 3*a* and the elasticity in FIG. 3*b*.

DETAILED DESCRIPTION OF THE PRESENT INVENTION

Figure 1A:
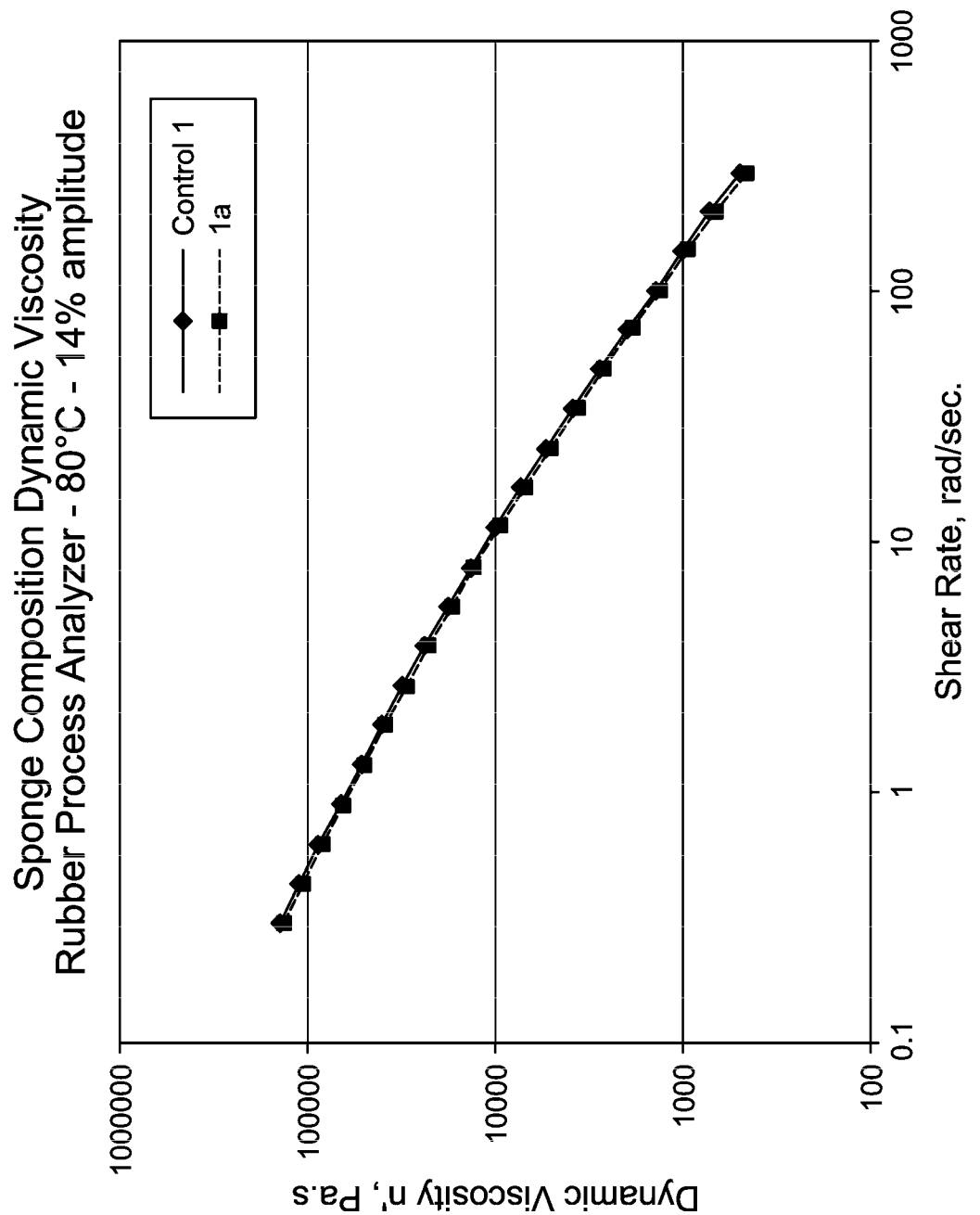
FIGS. 1 to 3 depict the dynamic viscosity (at 80° C.) and elasticity (at 80° C.) for the foamed sponge samples of Example 1.

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

As used herein, a "polymer" may be used to refer to homopolymers, copolymers, interpolymers, terpolymers, etc.

As used herein, when a polymer is referred to as comprising a monomer, the monomer is present in the polymer in the polymerized form of the monomer or in the derivative form of the monomer.

As used herein, when a polymer composition or blend is said to comprise a certain percentage, wt %, of a monomer, that percentage of monomer is based on the total amount of monomer units in all the polymer components of the composition or blend.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber(s)."

"Phr" is parts per hundred rubber or "parts", and is a measure common in the art wherein components of a composition are measured relative to a major elastomer component, based upon 100 parts by weight of the elastomer(s) or rubber(s). As used in composition formulations herein, phr measurements are relative to the total amount of ethylene-propylene-diene terpolymer and propylene-based elastomer in the composition, regardless as to whether the ethylene-propylene-diene terpolymer or propylene-based elastomer meet the definition of elastomer or rubber of ASTM D1566.

As used herein, a "comparative composition sample" refers to a composition free of the propylene-based elastomer described herein but is otherwise identical in terms of its constituents.

As used herein, a "comparative profile sample" refers to a foamed profile comprising a composition free of the propylene-based elastomer described herein but is otherwise identical in terms of its constituents.

As used herein, a composition "free of" a component refers to a composition substantially devoid of the component, or comprising the component in an amount of less than about 0.01 wt %, by weight of the total composition.

The present invention relates to compositions comprising a propylene-based elastomer, methods of making the same, foamed profiles comprising said compositions, and articles made therefrom. The composition may comprise: (a) an ethylene-propylene-diene terpolymer; (b) a propylene-based elastomer having at least about 60 wt % propylene-derived units and about 5 to about 25 wt % ethylene-derived units, based on total weight of the propylene-based elastomer, and a heat of fusion of less than about 80 J/g; and (c) a foaming agent. Also provided are foamed profiles comprising the compositions described herein. Preferably, the foamed profile has a density (ASTM D792-08, 23° C.) at least about 5% lower than the density of a comparative profile sample.

Ethylene-Propylene-Diene Terpolymer

The compositions described herein include an ethylene-propylene-diene terpolymer (EPDM).

The EPDM may have a Mooney viscosity (ML [1+4] 125° C.) of from about 25 to about 300, or from 50 to 120, or from 60 to 100, as determined according to ASTM D1646. In some embodiments, the EPDM has a Mooney viscosity (ML [1+4] 125° C.) of from about 25, about 30, about 35, about 40, about 45, about 50, about 55, about 60, about 65, about 70, to about 75, about 80, about 85, about 90, about 95, about 100, about 105, about 110, about 115, about 120, about 125, about 130, about 135, about 140, about 145, about 150, about 155, about 160, about 165, about 170, about 175, about 180, about 185, about 190, about 195, about 200, about 205, about 210, about 215, about 220, about 225, about 230, about 235, about 240, about 245, about 250, about 255, about 260, about 265, about 270, about 275, about 280, about 285, about 290, about 295, or about 300, or in the range of any combination of the values recited herein.

The EPDM may have an ethylene content, as determined by ASTM D3900, of from about 40, about 41, about 42, about 43, about 44, about 45, about 46, about 47, about 48, about 49, about 50, about 51, about 52, about 53, about 54, about 55, about 56, about 57, about 58, about 59, about 60, about 61, about 62, about 63, about 64, about 65, to about 70, about 71, about 72, about 73, about 74, about 75, about 76, about 77, about 78, about 79, about 80, about 81, about 82, about 83, about 84, about 85, about 86, about 87, about 88, about 89, about 90 wt % of the EPDM, or in the range of any combination of the values recited herein.

In some embodiments, the EPDM has a Mooney viscosity (ML [1+4] 125° C.) of about 25 to about 300 and an ethylene content of at least about 40 wt % of the EPDM. In other embodiments, the EPDM has a Mooney viscosity (ML [1+4] 125° C.) of about 50 to about 120, and an ethylene content of about 50 to about 75 wt % of the EPDM. In yet other embodiments, the EPDM has a Mooney viscosity (ML [1+4] 125° C.) of about 60 to about 100, and an ethylene content of about 50 to about 60 wt % of the EPDM.

The amount of the diene-derived units (or "diene") in the EPDM may vary from about 0.3 to about 15 wt %, or from about 2 to about 12 wt %, or from about 5 to about 10 wt %, or from about 7 to about 10 wt %. Suitable dienes include, for example: 1,4-hexadiene, 1,6-octadiene, 5-methyl-1,4-hexadiene, 3,7-dimethyl-1,6-octadiene, dicyclopentadiene (DCPD), ethylidene norbornene (ENB), norbornadiene, 5-vinyl-2-norbornene (VNB), and combinations thereof. Preferred dienes include ENB and VNB.

The ethylene content of the EPDM is determined by ASTM D3900, and is not corrected for diene content. The diene content of an EPDM containing ENB may be determined by FTIR, ASTM D6047. The diene content of an EPDM containing VNB may be measured via $^1$H NMR. These methods measure available unsaturation. Thus, the measured incorporation may be lower than the actual incorporation because dienes having pendant unsaturated moieties have been converted, e.g., by hydrogen, and are not detected in the measurement. If the EPDM contains both ENB and VNB, $^{13}$C NMR is preferably used to determine diene content.

The EPDM polymers described herein preferably have a MWD of from about 2 to about 20. As used herein, MWD ($M_w/M_n$) is determined according to methods well known in the art, for example by GPC (Gel Permeation Chromatography) on a Waters 150 gel permeation chromatograph equipped with a differential refractive index (DRI) detector and a Chromatix KMX-6 on line light scattering photometer. The system is used at 135° C. with 1,2,4-trichlorobenzene as the mobile phase using Shodex (Showa Denko America, Inc) polystyrene gel columns 802, 803, 804, and 805. This technique is discussed in "Liquid Chromatography of Polymers and Related Materials III," J. Cazes editor, Marcel Dekker, 1981, p. 207, which is incorporated herein by reference. No corrections for column spreading are employed; however, data on generally accepted standards, e.g., National Bureau of Standards Polyethylene 1484 and anionically produced hydrogenated polyisoprenes (alternating ethylene-propylene copolymers) demonstrate that such corrections on MWD are less than 0.05 units. $M_w/M_n$ is calculated from elution times. The numerical analyses are performed using the commercially available Beckman/CIS customized LALLS software in conjunction with the standard Gel Permeation package. Reference to $M_w/M_n$ implies that the $M_w$ is the value reported using the LALLS detector and $M_n$ is the value reported using the DRI detector described above.

Preferred EPDM polymers have a triad tacticity, as measured by $^{13}$C NMR, of 75% or greater, 80% or greater, 82% or greater, 85% or greater, or 90% or greater. The $^{13}$C NMR spectrum of the EPDM polymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm), and a third region (19.5-20.3 ppm). Each peak in the spectrum was assigned with reference to the article in the journal Polymer, Volume 30 (1989), page 1350. The calculation of the triad tacticity is outlined in the techniques shown in U.S. Pat. No. 5,504,172.

The EPDM polymer may have a heat of fusion ($\Delta H_f$) which is greater than or equal to about 0.5 Joules per gram (J/g), or greater than or equal to about 1 J/g, or greater than or equal to about 2.5 J/g, or greater than or equal to about 5 J/g. Preferably the EPDM polymers also have a heat of fusion that is less than or equal to about 70 J/g, or less than or equal to about 50 J/g, or less than or equal to about 35 J/g, or less than or equal to about 25 J/g. Thermodynamic heat of fusion data may be determined by differential scanning calorimetry (DSC), the procedure for which is as follows. About 6 to about 10 mg of a sheet of the polymer pressed at approximately 200° C. to 230° C. and cooled at ambient conditions (25° C. and 50% humidity for 24 hours) is removed with a punch die. This sample is annealed at room temperature for 80 to 100 hours. At the end of the annealing period, the sample is placed in a differential scanning calorimeter (Perkin Elmer 7 Series Thermal Analysis System) and cooled to −50° C. to −70° C. The sample is then heated at a rate of 20° C./min to a final temperature of 200° C. to 220° C. The thermal output is recorded as the area under the melting peak curve of the sample, which is typically peaked at 30° C. to 175° C., and occurs between the temperatures of 0° C. and 200° C. The thermal output in joules is a measure of the heat of fusion.

The EPDM polymer may have a % crystallinity of from 0.5 to 40, or 1 to 30, or 5 to 25, where the % crystallinity is determined according to the DSC procedure described herein. For use herein, the crystallinity of the EPDM polymer can also be expressed in terms of percentage of crystallinity. The thermal energy for the highest order of polypropylene is estimated at 189 J/g (i.e., 100% crystallinity is equal to 189 J/g). In some embodiments, the EPDM polymer has a crystallinity of less than 40%, preferably about 0.25% to about 25%, or from about 0.5% to about 22%, or from about 0.5% to about 20%.

The EPDM polymer preferably has a single broad melting transition. The melting point is defined as the temperature of the greatest heat absorption within the range of melting of the sample. However, the EPDM polymer may show secondary melting peaks adjacent to the principal peak, but for purposes herein, such secondary melting peaks are considered together as a single melting point, with the highest of these peaks being considered the melting point ($T_m$) of the EPDM polymer. The EPDM polymer preferably has a melting point of from about 25° C. to 105° C., or from about 25° C. to about 85° C., or from about 25° C. to about 75° C., or from about 25° C. to about 65° C., or from about 30° C. to about 80° C., or from about 30° C. to about 70° C., or from about 30° C. to about 60° C.

Suitable EPDM polymers may be commercially available under the trade name VISTALON™ (ExxonMobil Chemical Company, Houston, Tex., USA).

Propylene-Based Elastomer

The propylene-based elastomer is a copolymer of propylene-derived units and units derived from at least one of ethylene or a $C_4$-$C_{10}$ alpha-olefin. The propylene-based elastomer may contain at least about 50 wt % propylene-derived units. The propylene-based elastomer may have limited crystallinity due to adjacent isotactic propylene units and a melting point as described herein. The crystallinity and the melting point of the propylene-based elastomer can be reduced compared to highly isotactic polypropylene by the introduction of errors in the insertion of propylene. The propylene-based elastomer is generally devoid of any substantial intermolecular heterogeneity in tacticity and comonomer composition, and also generally devoid of any substantial heterogeneity in intramolecular composition distribution.

The amount of propylene-derived units present in the propylene-based elastomer may range from an upper limit of about 95 wt %, about 94 wt %, about 92 wt %, about 90 wt %, or about 85 wt %, to a lower limit of about 60 wt %, about 65 wt %, about 70 wt %, about 75 wt %, about 80 wt %, about 84 wt %, or about 85 wt % of the propylene-based elastomer.

The units, or comonomers, derived from at least one of ethylene or a $C_4$-$C_{10}$ alpha-olefin may be present in an amount of about 1 to about 35 wt %, or about 5 to about 35 wt %, or about 7 to about 32 wt %, or about 8 to about 25 wt %, or about 8 to about 20 wt %, or about 8 to about 18 wt %, of the propylene-based elastomer. The comonomer content may be adjusted so that the propylene-based elastomer has a heat of fusion of less than about 80 J/g, a melting point of about 105° C. or less, and a crystallinity of about 2% to about 65% of the crystallinity of isotactic polypropylene, and a melt flow rate (MFR) of about 2 to about 20 g/min.

In preferred embodiments, the comonomer is ethylene, 1-hexene, or 1-octene, with ethylene being most preferred. In embodiments where the propylene-based elastomer comprises ethylene-derived units, the propylene-based elastomer may comprise about 5 to about 25 wt %, or about 8 to about 20 wt %, or about 9 to about 16 wt %, ethylene-derived units. In some embodiments, the propylene-based elastomer consists essentially of units derived from propylene and ethylene, i.e., the propylene-based elastomer does not contain any other comonomer in an amount other than that typically present as impurities in the ethylene and/or propylene feedstreams used during polymerization, or in an amount that would materially affect the heat of fusion, melting point, crystallinity, or melt flow rate of the propylene-based elastomer, or in an amount such that any other comonomer is intentionally added to the polymerization process.

In some embodiments, the propylene-based elastomer may comprise more than one comonomer. Preferred embodiments of a propylene-based elastomer having more than one comonomer include propylene-ethylene-octene, propylene-ethylene-hexene, and propylene-ethylene-butene polymers. In embodiments where more than one comonomer derived from at least one of ethylene or a $C_4$-$C_{10}$ alpha-olefin is present, the amount of one comonomer may be less than about 5 wt % of the propylene-based elastomer, but the combined amount of comonomers of the propylene-based elastomer is about 5 wt % or greater.

The propylene-based elastomer may have a triad tacticity of three propylene units, as measured by $^{13}C$ NMR, of at least about 75%, at least about 80%, at least about 82%, at least about 85%, or at least about 90%. Preferably, the propylene-based elastomer has a triad tacticity of about 50 to about 99%, or about 60 to about 99%, or about 75 to about 99%, or about 80 to about 99%. In some embodiments, the propylene-based elastomer may have a triad tacticity of about 60 to 97%.

The propylene-based elastomer has a heat of fusion ("$H_f$"), as determined by DSC, of about 80 J/g or less, or about 70 J/g or less, or about 50 J/g or less, or about 40 J/g or less. The propylene-based elastomer may have a lower limit $H_f$ of about 0.5 J/g, or about 1 J/g, or about 5 J/g. For example, the $H_f$ value may range from about 1.0, 1.5, 3.0, 4.0, 6.0, or 7.0 J/g, to about 30, 35, 40, 50, 60, 70, 75, or 80 J/g.

The propylene-based elastomer may have a percent crystallinity, as determined according to the DSC procedure described herein, of about 2 to about 65%, or about 0.5 to about 40%, or about 1 to about 30%, or about 5 to about 35%, of the crystallinity of isotactic polypropylene. The thermal energy for the highest order of propylene (i.e., 100% crystallinity) is estimated at 189 J/g. In some embodiments, the copolymer has crystallinity less than 40%, or in the range of about 0.25 to about 25%, or in the range of about 0.5 to about 22% of the crystallinity of isotactic polypropylene.

Embodiments of the propylene-based elastomer may have a tacticity index m/r from a lower limit of about 4, or about 6, to an upper limit of about 8, or about 10, or about 12. In some embodiments, the propylene-based elastomer has an isotacticity index greater than 0%, or within the range having an upper limit of about 50%, or about 25%, and a lower limit of about 3%, or about 10%.

In some embodiments, the propylene-based elastomer may further comprise diene-derived units (as used herein, "diene"). The optional diene may be any hydrocarbon structure having at least two unsaturated bonds wherein at least one of the unsaturated bonds is readily incorporated into a polymer. For example, the optional diene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicyclo-(2.2.1)-hepta-2,5-diene, norbornadiene, alkenyl norbornenes, alkylidene norbornenes, e.g., ethylidene norbornene ("ENB"), cycloalkenyl norbornenes, and cycloalkylidene norbornenes (such as 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene); and cycloalkenyl-substituted alkenes, such as vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. The amount of diene-derived units present in the propylene-based elastomer may range from an upper limit of about 15%, about 10%, about 7%, about 5%, about 4.5%, about 3%, about 2.5%, or about 1.5%, to a lower limit of about 0%, about 0.1%, about 0.2%, about 0.3%, about 0.5%, about 1%, about 3%, or about 5%, based on the total weight of the propylene-based elastomer.

The propylene-based elastomer may have a single peak melting transition as determined by DSC. In some embodiments, the copolymer has a primary peak transition of about 90° C. or less, with a broad end-of-melt transition of about 110° C. or greater. The peak "melting point" ("$T_m$") is defined as the temperature of the greatest heat absorption within the range of melting of the sample. However, the copolymer may show secondary melting peaks adjacent to the principal peak, and/or at the end-of-melt transition. For the purposes of this disclosure, such secondary melting peaks are considered together as a single melting point, with the highest of these peaks being considered the $T_m$ of the propylene-based elastomer. The propylene-based elastomer may have a $T_m$ of about 110° C. or less, about 105° C. or less, about 100° C. or less, about 90° C. or less, about 80° C. or less, or about 70° C. or less. In some embodiments, the propylene-based elastomer has a $T_m$ of about 25 to about 105° C., or about 60 to about 105° C., or about 70 to about 105° C., or about 90 to about 105° C.

The propylene-based elastomer may have a density of about 0.850 to about 0.900 g/cm$^3$, or about 0.860 to about 0.880 g/cm$^3$, at room temperature as measured per ASTM D1505.

The propylene-based elastomer may have a melt flow rate ("MFR"), as measured per ASTM D1238, 2.16 kg at 230° C., of at least about 2 g/10 min. In some embodiments, the propylene-based elastomer may have an MFR of about 2 to about 20 g/10 min, or about 2 to about 10 g/10 min, or about 2 to about 5 g/10 min.

The propylene-based elastomer may have an Elongation at Break of less than about 2000%, less than about 1800%, less than about 1500%, less than about 1000%, or less than about 800%, as measured per ASTM D412.

The propylene-based elastomer may have a weight average molecular weight ($M_w$) of about 5,000 to about 5,000,000 g/mole, or about 10,000 to about 1,000,000 g/mole, or about 50,000 to about 400,000 g/mole. The propylene-based elastomer may have a number average molecular weight ($M_n$) of about 2,500 to about 250,000 g/mole, or about 10,000 to about 250,000 g/mole, or about 25,000 to about 250,000 g/mole. The propylene-based elastomer may have a z-average molecular weight ($M_z$) of about 10,000 to about 7,000,000 g/mole, or about 80,000 to about 700,000 g/mole, or about 100,000 to about 500,000 g/mole.

The propylene-based elastomer may have a molecular weight distribution ("MWD") of about 1.5 to about 20, or about 1.5 to about 15, or about 1.5 to about 5, or about 1.8 to about 3, or about 1.8 to about 2.5.

In some embodiments, the propylene-based elastomer is an elastomer including propylene-crystallinity, a melting point by DSC equal to or less than 105° C., and a heat of fusion of from about 5 J/g to about 45 J/g. The propylene-derived units are present in an amount of about 80 to about 90 wt %, based on the total weight of the propylene-based elastomer. The ethylene-derived units are present in an amount of about 8 to about 18 wt %, for example, about 8, about 8.5, about 9, about 9.5, about 10, about 10.5, about 11, about 11.5, about 12, about 12.5, about 13, about 13.5, about 14, about 14.5, about 15, about 15.5, about 16, about 16.5, about 17, about 17.5, about 18 wt %, based on the total weight of the propylene-based elastomer.

The compositions disclosed herein may include one or more different propylene-based elastomers, i.e., propylene-based elastomers each having one or more different properties such as, for example, different comonomer or comonomer content. Such combinations of various propylene-based elastomers are all within the scope of the invention.

The propylene-based elastomer may comprise copolymers prepared according to the procedures described in WO 02/36651, U.S. Pat. No. 6,992,158, and/or WO 00/01745. Preferred methods for producing the propylene-based elastomer may be found in U.S. Pat. Nos. 7,232,871 and 6,881,800. The invention is not limited by any particular polymerization method for preparing the propylene-based elastomer, and the polymerization processes are not limited by any particular type of reaction vessel.

Suitable propylene-based elastomers may be available commercially under the trade names VISTAMAXX™ (ExxonMobil Chemical Company, Houston, Tex., USA), VERSIFY™ (The Dow Chemical Company, Midland, Mich., USA), certain grades of TAFMER™ XM or NOTIO™ (Mitsui Company, Japan), and certain grades of SOFTEL™ (Basell Polyolefins of the Netherlands). The particular grade(s) of commercially available propylene-based elastomer suitable for use in the invention can be readily determined using methods commonly known in the art.

Foaming Agent

Foaming agents useful in foaming the composition used for the foamed profile include, but are not limited to, decomposable chemical foaming agents. Such chemical foaming agents decompose at elevated temperatures to form gases or vapors to blow the polymer into foam form. These agents allow reduction in cost of raw materials. The agent preferably takes a solid form, so it is conveniently dry-blended with the polymer material.

Chemical foaming agents include, but are not limited to, organic foaming agents, such as 4,4'-oxybis benzene sulfonyl hydrazide; azodicarbonamide; azobisformamide; azobisisobutyronitrile; diazoaminobenzene; N,N-dimethyl-N,N-dinitroso terephthalamide; N,N-dinitrosopentamethylenetetramine; benzenesulfonyl-hydrazide; benzene-1,3-disulfonyl hydrazide; diphenylsulfon-3-3, disulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic foaming agents such as ammonium bicarbonate and sodium bicarbonate. Specifically, the foaming agent can be 4,4'-oxybis benzene sulfonyl hydrazide (OBSH). A gas, such as air, nitrogen, carbon dioxide, etc., may also be injected into the composition during the injection molding process.

The foaming agent can be employed in an amount of less than or equal to about 25 phr, less than or equal to about 20 phr, less than or equal to about 15 phr, less than or equal to about 10 phr, or less than or equal to about 6 phr, relative to the total amount of EPDM and propylene-based elastomer to be foamed. In some embodiments, the foaming agent may be used in an amount of about 0.1 phr to 25 phr, about 0.2 phr to 20 phr, about 0.3 phr to 15 phr, about 0.4 phr to 10 phr, or 0.5 phr to about 6 phr, relative to the total amount of EPDM and propylene-based elastomer to be foamed.

Useful foaming agents can include those commercially available under the trade names CELOGEN™ (Chemtura Corporation, Philadelphia, Pa., USA), GENITRON™, POROFOR™, FICEL™ (Lanxess AG, Germany), SUVA™, DYMELT™, FORMACEL™, ZYRON™ (DuPont Chemical Company, Wilmington, Del., USA), and PLANAGEN™ (INBRA S.A., Brazil).

Other Additives

The compositions described herein may further comprise one or more additives. Suitable additives include, but are not limited to, fillers, processing aids, antioxidants, UV stabilizers, curing agents, accelerators, flame retardants, colorants or pigments, and combinations thereof. In some embodiments, the composition further comprises at least one additive selected from fillers, processing aids, curing agents, accelerators, or combinations thereof.

The composition of the present invention may include at least one filler. The classes of materials described herein that are useful as fillers can be utilized alone or admixed to obtain desired properties. The filler may be present at from about 50 phr to about 150 phr relative to the total amount of EPDM and the propylene-based elastomer. Desirable fillers can be organic fillers and/or inorganic fillers. Organic fillers include such materials as carbon black, fly ash, graphite, cellulose, starch, flour, wood flour, and polymeric fibers like polyester-based, and polyamide-based materials, etc. Preferred examples of inorganic fillers are calcium carbonate, talc, glass fibers, marble dust, cement dust, clay, feldspar, silica or glass, fumed silica, alumina, magnesium oxide, antimony oxide, zinc oxide, barium sulfate, calcium sulfate, aluminum silicate, calcium silicate, titanium dioxide, titanates, clay, nanoclay, organo-modified clay or nanoclay, glass microspheres, and chalk. Of these fillers, calcium carbonate, barium sulfate, antimony oxide, talc, silica/glass, glass fibers, alumina, aluminum trihydroxide, magnesium hydroxide, and titanium dioxide, and mixtures thereof are preferred.

The composition can optionally include one or more processing aids. Suitable processing aids can include, but are not limited to, plasticizers, tackifiers, extenders, chemical conditioners, homogenizing agents and peptizers such as mercaptans, petroleum and vulcanized vegetable oils, mineral oils, paraffin oils, polybutene oils, naphthenic oils, aromatic oils, waxes, resins, rosins, or other synthetic fluids having a lower pour point, lower emission, etc., compared to paraffin or mineral oil and the like. Some commercial examples of useful processing aids are SUNDEX™ (Sun Chemicals) and FLEXON™ (ExxonMobil Chemical Company).

Cross-linking and curing agents for use in the present invention can include sulfur, zinc oxide, and fatty acids. Peroxide cure systems can also be used. Generally, polymer compositions can be crosslinked by adding curative molecules, for example sulfur, metal oxides (i.e., zinc oxide), organometallic compounds, radical initiators, etc., followed by heating. In particular, the following are common curatives that may be used: ZnO, CaO, MgO, $Al_2O_3$, $CrO_3$, FeO, $Fe_2O_3$, and NiO. These metal oxides can be used in conjunction with the corresponding metal stearate complex (e.g., $Zn(Stearate)_2$, $Ca(Stearate)_2$, $Mg(Stearate)_2$, and $Al(Stearate)_3$), or with stearic acid, and a sulfur compound or an alkylperoxide compound.

Accelerators that may be used include amines, guanidines, thioureas, thiazoles, thiurams, sulfenamides, sulfenimides, thiocarbamates, xanthates, and the like. Acceleration of the cure process can be accomplished by adding to the composition an amount of the accelerator. The mechanism for accelerated vulcanization of the compositions comprising EPDM involves complex interactions between the curative, accelerator, activators and polymers. Ideally, the entire available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), N'N-di-ortho-tolyl guanidine (DOTG), dipentamethylenethiuram tetrasulfide (DPTT), 4,4'-dithiodimorpholine (DTDM), tetrabutylthiuram disulfide (TBTD), 2-mercaptobenzthiazole (MBT), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR 90), N-tertiarybutyl-2-benzothiazole sulfenamide (TBBS), N-oxydiethylene thiocarbamyl-N-oxydiethylene sulfonamide (OTOS), zinc diethyldithiocarbamate (ZDEC), zinc 2-ethyl hexanoate (ZEH), and N,N'-diethyl thiourea.

Methods for Making the Composition and Foamed Profiles Comprising the Composition Also provided are methods for making the compositions disclosed herein. The method may comprise the steps of: (a) combining (i) an ethylene-propylene-diene terpolymer; (ii) a propylene-based elastomer having at least about 60 wt % propylene-derived units and about 5 to about 25 wt % ethylene-derived units, based on total weight of the propylene-based elastomer, and a heat of fusion of less than about 80 J/g; and (iii) a foaming agent; and (b) forming the composition.

EPDM(s), the propylene-based elastomer(s), foaming agent(s), and other optional additives can be blended by any suitable means. For example, they may be blended in a tumbler, continuous mixer, static mixer, batch mixer, extruder, or a combination thereof that is sufficient to achieve an adequate dispersion of the components. Methods of blending include dry-blending, melt-blending in a batch mixer or in an extruder, or by a combination thereof. Blending may also involve a "masterbatch" approach, where the target concentration of the propylene-based elastomer is achieved by combining neat EPDMs and propylene-based elastomers and optionally fillers and/or additives with an appropriate amount of pre-blended masterbatch, followed by addition of foaming agents and optionally curing agents, accelerators, and/or other additives to make the final compositions. Dispersion (or "letdown") of the masterbatch may take place as part of a processing step used to fabricate articles, such as in the extruder on an injection molding machine or on a continuous extrusion line, or during a separate compounding step.

Preferably, the composition is prepared by blending the components in a batch mixer, such as a twin rotor internal mixer equipped with a pressure ram. Mixing can be performed at pressures and temperatures such that the filler and other compounding components are finely incorporated and become uniformly dispersed within the EPDM and propylene-based elastomer.

The present invention encompasses a foamed profile produced using the methods and comprising the compositions of the present invention, and further encompasses a seal article made from the foamed profile, including automotive parts, consumer goods, industrial goods, construction materials, and packaging materials. Examples of the article include, but are not limited to, an extruded article, such as an automotive weatherseal, a non-automotive weatherseal, a building profile, etc.; a molded article, such as a seal, a gasket, etc.; a hose, such as air hose, heat hose, garden hose, industry hose, etc.; a roof sheet; a film; or a cable jacket, etc.

The foamed profile may be made or formed by any useful discrete molding or continuous extrusion means for forming and shaping polyolefins known in the art, including: sheet extrusion, profile extrusion or co-extrusion, compression molding, injection molding, co-injection molding, gas-assisted injection molding, transfer molding, foam molding, transfer molding, vacuum forming, lamination, calendering, or other forms of processing such as described in, for example, "Rubber Technology," by Maurice Norton (Van Nostrand Reinhold—New York), or combinations thereof.

In one embodiment, the composition prepared as stated above is extruded from a rubber extruder into a sheet-like shape or the like (molding step), and the extruded composition is heated to be vulcanized and foamed (foaming step). It may pass through a two-stage heating zone including a microwave heating chamber to be vulcanized and foamed and a hot air heating chamber to produce a foamed extrusion profile.

Heating conditions for the composition are selected appropriately according to the vulcanization initiation temperature of the blended curing agent, the foaming temperature of the blended foaming agent, and the like. For example, using a circulating hot air oven or the like, the foam composition is pre-heated at a temperature in a range of, e.g., 40 to 200° C., or 60 to 160° C. for, e.g., 1 to 30 minutes, or 1 to 10 minutes, or 1 to 5 minutes, and then heated at a temperature of not more than 450° C., or in the range of 100 to 400° C., or 120 to 350° C. for, e.g., 1 to 80 minutes, or 2 to 50 minutes.

Alternatively, using an extruder, the prepared composition can also be continuously extruded (molding step) into a sheet-like shape, while being heated, to be continuously vulcanized and foamed (foaming step). In this manner, the composition is vulcanized, while being foamed, and the foamed profile can be obtained.

Alternatively, using a press, the prepared composition can also be molded into a sheet-like shape, while being heated, to be vulcanized and foamed (foaming step) at opening of the press. In this manner, the composition is vulcanized, while being foamed, and the foamed sheet can be obtained.

Due to its relatively low molecular weight and thermoplastic nature, the propylene-based elastomer in the composition described herein reduces the density of the foamed profile made therefrom by facilitating gas expansion and creating larger open cells during the foaming step. Meanwhile, although the addition of the propylene-based elastomer may lead to a reduction in the crosslinking density of the composition and slight rigidification of the foamed profile, it may also lead to an increase in compression set and a reduction in compression load deflection of the foamed profile. Thus, the foamed compositions described herein may have reduced density compared to comparative profiles without significantly compromising compression set or compression load deflection, thus delivering desirable performance to the final seal articles made from the foamed profile.

In some embodiments, the composition, preferably in which the propylene-based elastomer is present in an amount of less than or equal to about 20 phr relative to the total of EPDM and the propylene-based elastomer, provides a foamed profile made therefrom with a density (ASTM D792-08, 23° C.) at least about 5%, about 7%, about 10%, or about 12% lower than the density of a comparative profile sample.

In some embodiments, the foamed profile described herein has at least one of the following properties: (i) a compression set (7 days, 70° C., 40% deflection) at most about 30% higher, and (ii) a compression load deflection (room temperature, 40% deflection) at most about 5% lower, than that of a comparative profile sample.

The present invention also relates to a method for reducing the density of a foamed profile. The method may comprises the steps of: (a) combining (i) an ethylene-propylene-diene terpolymer; (ii) a propylene-based elastomer having at least about 60 wt % propylene-derived units and about 5 to about 25 wt % ethylene-derived units, based on total weight of the propylene-based elastomer, and a heat of fusion of less than about 80 J/g; and (iii) a foaming agent to form a composition; and (b) forming a foamed profile comprising the composition in (a), wherein the foamed profile has a density (ASTM D792-08, 23° C.) at least about 5% lower than the density of a comparative profile sample.

Other embodiments of the invention are described as follows.

Embodiment A

A composition comprising: (a) an ethylene-propylene-diene terpolymer; (b) a propylene-based elastomer having at least about 60 wt % propylene-derived units and about 5 to about 25 wt % ethylene-derived units, based on total weight of the propylene-based elastomer, and a heat of fusion of less than about 80 J/g; and (c) a foaming agent.

Embodiment B

The composition of Embodiment A, wherein the ethylene-propylene-diene terpolymer has at least one of the following: (i) a Mooney viscosity [ML(1+4) 125° C.] of about 25 to about 300, (ii) an ethylene content of at least about 40 wt %, and (iii) a diene content of about 0.3 to about 15 wt %, based on total weight of the ethylene-propylene-diene terpolymer.

Embodiment C

The composition of Embodiment A, wherein the ethylene-propylene-diene terpolymer has a Mooney viscosity [ML(1+4) 125° C.] of about 25 to about 300 and an ethylene content of at least about 40 wt % based on total weight of the ethylene-propylene-diene terpolymer.

Embodiment D

The composition of Embodiment A, wherein the ethylene-propylene-diene terpolymer has a Mooney viscosity [ML(1+4) 125° C.] of about 25 to about 300 and a diene content of about 0.3 to about 15 wt %, based on total weight of the ethylene-propylene-diene terpolymer.

Embodiment E

The composition of Embodiment A, wherein the ethylene-propylene-diene terpolymer has an ethylene content of at least about 40 wt % and a diene content of about 0.3 to about 15 wt %, based on total weight of the ethylene-propylene-diene terpolymer.

Embodiment F

The composition of Embodiment A, wherein the ethylene-propylene-diene terpolymer has a Mooney viscosity [ML(1+4) 125° C.] of about 25 to about 300, an ethylene content of at least about 40 wt %, and a diene content of about 0.3 to about 15 wt %, based on total weight of the ethylene-propylene-diene terpolymer.

Embodiment G

The composition of any one of Embodiments A to F, wherein the propylene-based elastomer is present in an amount of less than or equal to about 20 phr relative to the total of the ethylene-propylene-diene terpolymer and the propylene-based elastomer.

Embodiment H

The composition of any one of Embodiments A to G, wherein the foaming agent is present in an amount of less than or equal to about 25 phr relative to the total of the ethylene-propylene-diene terpolymer and the propylene-based elastomer.

Embodiment I

A composition comprising: (a) an ethylene-propylene-diene terpolymer having a Mooney viscosity [ML(1+4) 125° C.] of about 60 to about 100, an ethylene content of about 50 to about 60 wt %, and a diene content of about 7 to about 10 wt %, based on total weight of the ethylene-propylene-diene terpolymer; (b) a propylene-based elastomer in an amount of about 10 phr to about 15 phr relative to the total of the ethylene-propylene-diene terpolymer and the propylene-based elastomer, having at least about 60 wt % propylene-derived units and about 10 to about 20 wt % ethylene-derived units, based on total weight of the propylene-based elastomer, and a heat of fusion of less than about 80 J/g; and (c) a foaming agent in an amount of about 0.5 phr to about 6 phr relative to the total of the ethylene-propylene-diene terpolymer and the propylene-based elastomer.

Embodiment J

The composition of any one of Embodiments A to I, wherein the foaming agent comprises at least one of 4,4'-oxybis benzene sulfonyl hydrazide, azodicarbonamide, azobisformamide, azobisisobutyronitrile, diazoaminobenzene, N,N-dimethyl-N,N-dinitroso terephthalamide, N,N-dinitrosopentamethylene-tetramine, benzenesulfonyl-hydrazide, benzene-1,3-disulfonyl hydrazide; diphenylsulfon-3-3, disulfonyl hydrazide, p-toluene sulfonyl semicarbizide, barium azodicarboxylate, butylamine nitrile, nitroureas, trihydrazino triazine, phenyl-methyl-uranthan, p-sulfonhydrazide, and peroxides.

Embodiment K

The composition of any one of Embodiments A to I, wherein the foaming agent comprises 4,4'-oxybis benzene sulfonyl hydrazide.

Embodiment L

The composition of any one of Embodiments A to K, further comprising at least one of a filler, a processing aid, a curing agent, and an accelerator.

Embodiment M

A method for preparing the composition of any one of Embodiments A to J comprising the steps of: (a) combining the ethylene-propylene-diene terpolymer, the propylene-based elastomer, and the foaming agent; and (b) forming the composition.

Embodiment N

A method for preparing a composition, comprising the steps of: (a) combining (i) an ethylene-propylene-diene terpolymer; (ii) a propylene-based elastomer having at least about 60 wt % propylene-derived units and about 5 to about 25 wt % ethylene-derived units, based on total weight of the propylene-based elastomer, and a heat of fusion of less than about 80 J/g; and (iii) a foaming agent; and (b) forming the composition.

Embodiment O

A foamed profile comprising the composition of any one of Embodiments A to M.

Embodiment P

The foamed profile of Embodiment O, wherein the foamed profile is extruded.

Embodiment Q

The foamed profile of Embodiment O or P, wherein the foamed profile has a density (ASTM D792-08, 23° C.) at least about 5% lower than the density of a comparative profile sample.

Embodiment R

The foamed profile of any one of Embodiments O to Q, wherein the foamed profile has at least one of the following properties: (i) a compression load deflection (room temperature, 40% deflection) at most about 5% lower, than that of a comparative profile sample, and (ii) a compression set (7 days, 70° C., 40% deflection) at most about 30% higher, than that of a comparative profile sample.

Embodiment S

The foamed profile of any one of Embodiments O to Q, wherein the foamed profile has the following properties: (i) a compression load deflection (room temperature, 40% deflection) at most about 5% lower, than that of a comparative profile sample, and (ii) a compression set (7 days, 70° C., 40% deflection) at most about 30% higher, than that of a comparative profile sample.

Embodiment T

A seal article comprising the foamed profile of any one of Embodiments O to S.

Embodiment U

A method for reducing the density of a foamed profile, comprising the steps of: (a) combining (i) an ethylene-propylene-diene terpolymer; (ii) a propylene-based elastomer having at least about 60 wt % propylene-derived units and about 5 to about 25 wt % ethylene-derived units, based on total weight of the propylene-based elastomer, and a heat of fusion of less than about 80 J/g; and (iii) a foaming agent to form a composition; and (b) forming a foamed profile comprising the composition in (a), wherein the foamed profile has a density (ASTM D792-08, 23° C.) at least about 5% lower than the density of a comparative profile sample.

EXAMPLES

The present invention, while not meant to be limited by, may be better understood by reference to the following examples and tables.

Example 1

Example 1 illustrates the effects of a composition comprising the propylene-based elastomer described herein (composition Samples 1a, 2a and 2b) on targeted properties in comparison with a composition free of the propylene-based elastomer but otherwise identical in terms of its constituents (Control Samples 1 and 2).

Formulations with components and corresponding amounts used to the samples are listed below in Table 1. VISTALON™ 8600 EPDM rubber (ExxonMobil Chemical Company, Houston, Tex., USA) was used in Control 1 and composition Sample 1a, and VISTALON™ 7602 EPDM rubber was used in Control 2, composition Samples 2a and 2b, respectively (typical parameters of the VISTALON™ EPDMs used are shown in Table 2). VISTAMAXX™ 6102 propylene-based elastomer (ethylene content: 16.0 wt %, MFR: 3.0 g/10 min (230° C./2.16 kg)) (ExxonMobil Chemical Company, Houston, Tex., USA) was used in composition Samples 1a, 2a and 2b. The foaming agent used in the formulations was 4,4'-oxybis benzene sulfonyl hydrazide (OBSH).

Rheology indicating properties, including Mooney viscosity (ML (1+4) 100° C., ASTM D1646), Mooney Scorch (125° C., ASTM D1646) and MDR (arc±0.5, 180° C., ASTM D5289), of the compositions were measured and are listed in Table 3.

TABLE 1

Formulations (phr) for the Sponge Compositions of Example 1

| | Composition No. | | | | |
|---|---|---|---|---|---|
| | Control 1 | 1a | Control 2 | 2a | 2b |
| Masterbatch | | | | | |
| Vistalon ™ 8600 | 100 | 85 | — | — | — |
| Vistalon ™ 7602 | — | — | 100 | 85 | 75 |
| Vistamaxx ™ 6102 | — | 15 | — | 15 | 25 |
| Spheron ™ 5000 Carbon Black | 80 | 80 | 80 | 80 | 80 |
| Calcium Carbonate | 20 | 20 | 20 | 20 | 20 |
| Flexon ™ 815 Paraffinic Oil | 75 | 75 | 75 | 75 | 75 |
| Stearic Acid | 1.5 | 1.5 | 1.5 | 1.5 | 1.5 |
| Active Zinc Oxide | 4 | 4 | 4 | 4 | 4 |
| PolyEthylene Glycol 3000 | 1 | 1 | 1 | 1 | 1 |
| Rhenocure ™ ZAT: Zinc Amino Thiophosphate-(70%) Accelerator | 1.5 | 1.5 | 1.5 | 1.5 | 1.5 |
| Rhenocure ™ ThioPhosphate/ (50%) Accelerator | 1.5 | 1.5 | 1.5 | 1.5 | 1.5 |
| Finalization | | | | | |
| Rhenogran ™ CaO-80 Calcium Oxide | 2 | 2 | 2 | 2 | 2 |
| Sulfur | 1.5 | 1.5 | 1.5 | 1.5 | 1.5 |
| MBTS (80%) | 1 | 1 | 1 | 1 | 1 |
| MBT (80%) | 0.5 | 0.5 | 0.5 | 0.5 | 0.5 |
| DOTG | 0.2 | 0.2 | 0.2 | 0.2 | 0.2 |
| ZBEC Zinc diBEnzyl dithio Carbamate (70%) Accelerator | 1.8 | 1.8 | 1.8 | 1.8 | 1.8 |
| Vulkalent ™ E Retarder | 0.2 | 0.2 | 0.2 | 0.2 | 0.2 |
| OBSH: OrthoBenzene Sulfonyl Hydrazide: blow agent | 2.5 | 2.5 | 2.5 | 2.5 | 2.5 |
| Total | 294.2 | 294.2 | 294.2 | 294.2 | 294.2 |

TABLE 2

Typical Parameters of Vistalon ™ 8600 and Vistalon ™ 7602 EPDM

| Parameters | Vistalon ™ 8600 | Vistalon ™ 7602 |
|---|---|---|
| Mooney Viscosity | 81 (ML 1 + 8, 125° C.) | 65 (ML 1 + 4, 125° C.) |
| Ethylene Content (wt %) | 58.0 | 55.0 |
| ENB content (wt %) | 8.9 | 7.5 |
| MWD | Bimodal | Narrow |

TABLE 3

Rheology indicating properties of the Sponge Compositions of Example 1

| | Composition No. | | | | |
|---|---|---|---|---|---|
| | Control 1 | 1a | Control 2 | 2a | 2b |
| Mooney Viscosity | | | | | |
| ML (1 + 4) 100° C. [MU] | 40 | 37 | 44 | 40 | 39 |
| Mooney Scorch 125° C. | | | | | |
| t2 [min] | 3.2 | 3.4 | 3.5 | 3.5 | 3.7 |
| t5 [min] | 3.7 | 3.9 | 4.0 | 4.0 | 4.3 |

TABLE 3-continued

Rheology indicating properties of the Sponge Compositions of Example 1

| | Composition No. | | | | |
|---|---|---|---|---|---|
| | Control 1 | 1a | Control 2 | 2a | 2b |
| t10 [min] | 4.1 | 4.3 | 4.4 | 4.5 | 4.8 |
| minimum [MU] | 18 | 15 | 18 | 16 | 14 |
| MDR arc ± 0.5, 180° C. | | | | | |
| ML [dNm] | 1.07 | 0.94 | 1.19 | 0.99 | 0.9 |
| MH [dNm] | 11.3 | 7.8 | 10.8 | 8.5 | 7.1 |
| MH − ML [dNm] | 10.2 | 6.9 | 9.6 | 7.5 | 6.2 |
| Ts2 [min] | 0.33 | 0.36 | 0.34 | 0.37 | 0.4 |
| T90 [min] | 1.7 | 2.3 | 1.8 | 3.1 | 2.5 |

Figure 1B:
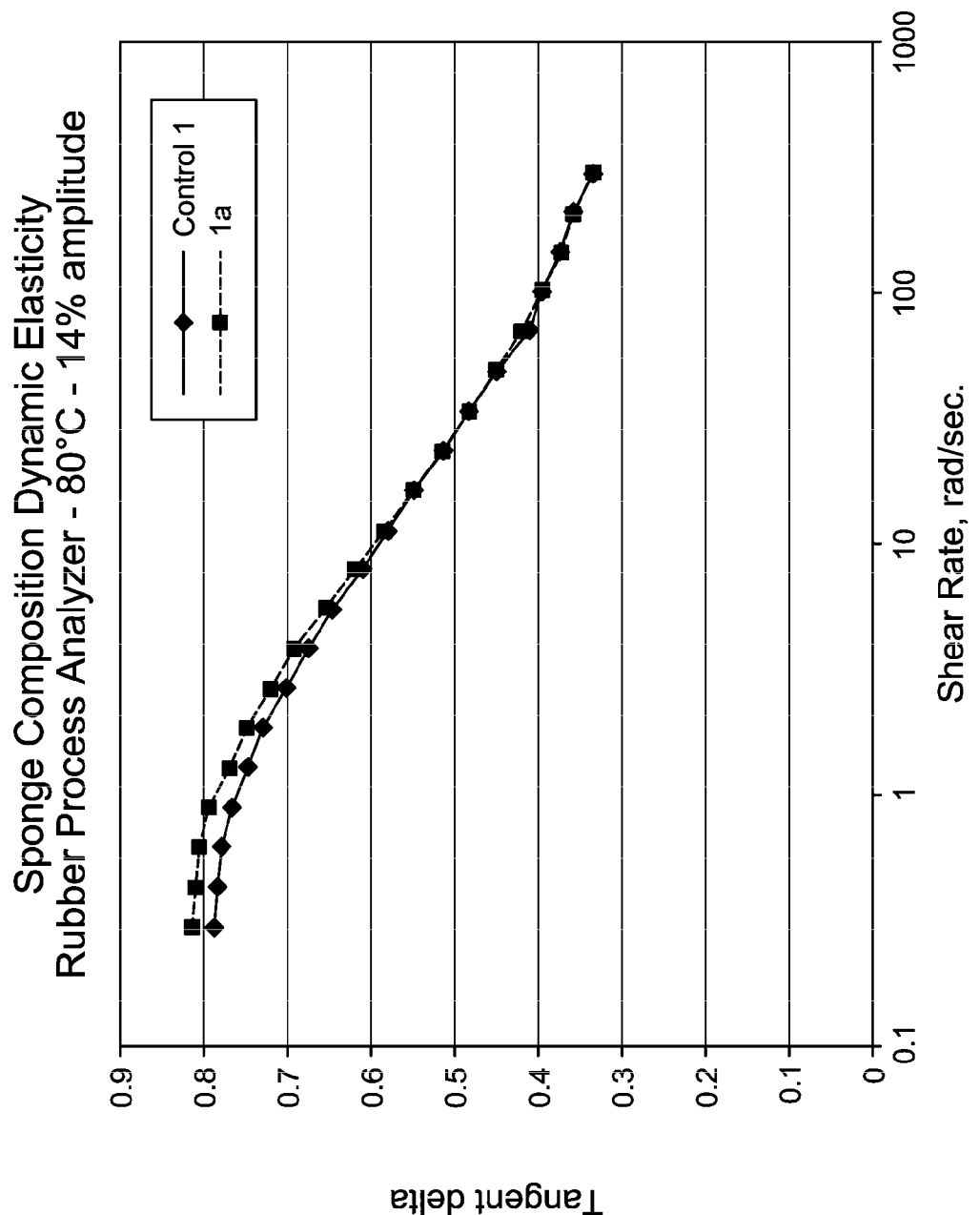
Figure 2A:
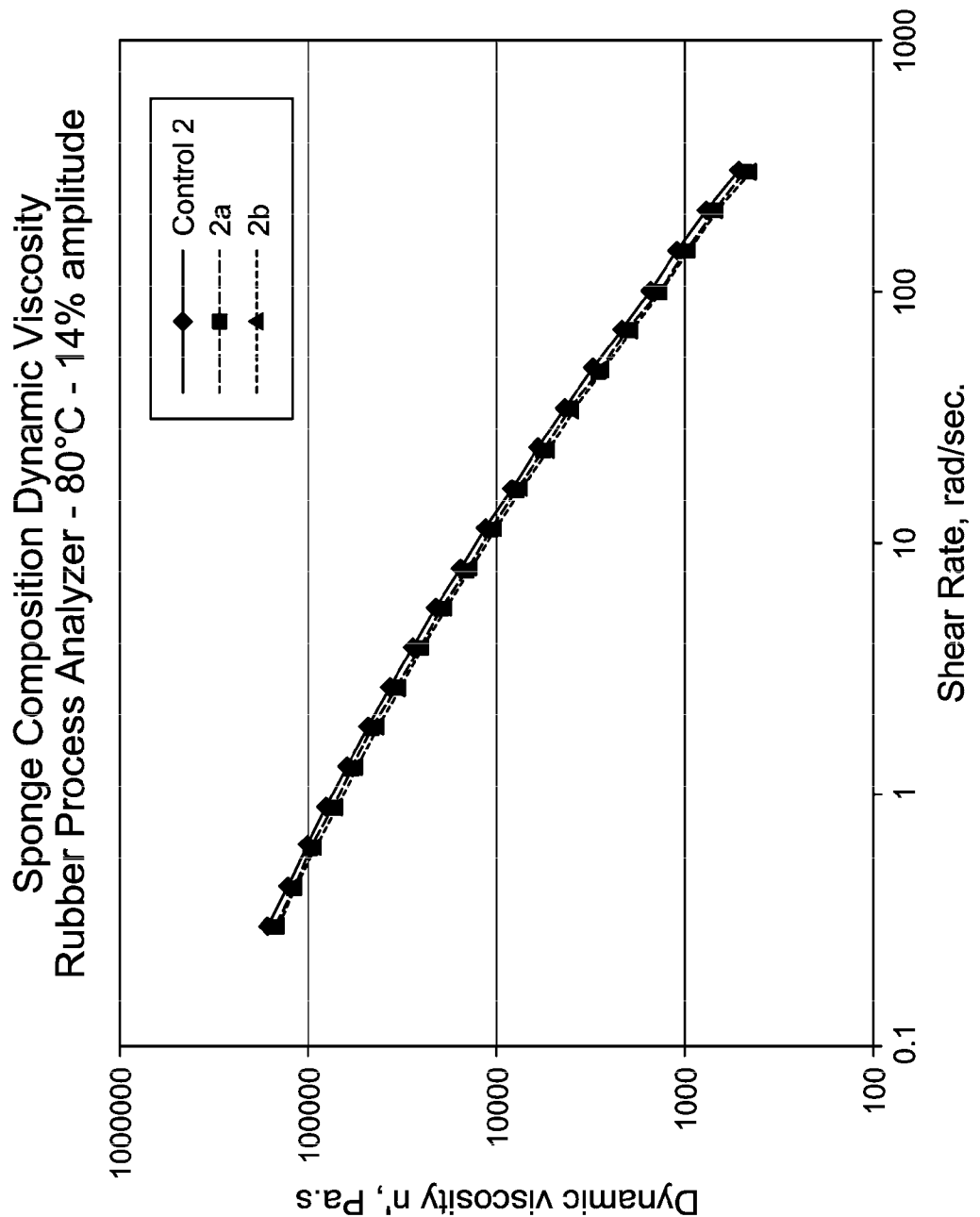
Figure 3A:
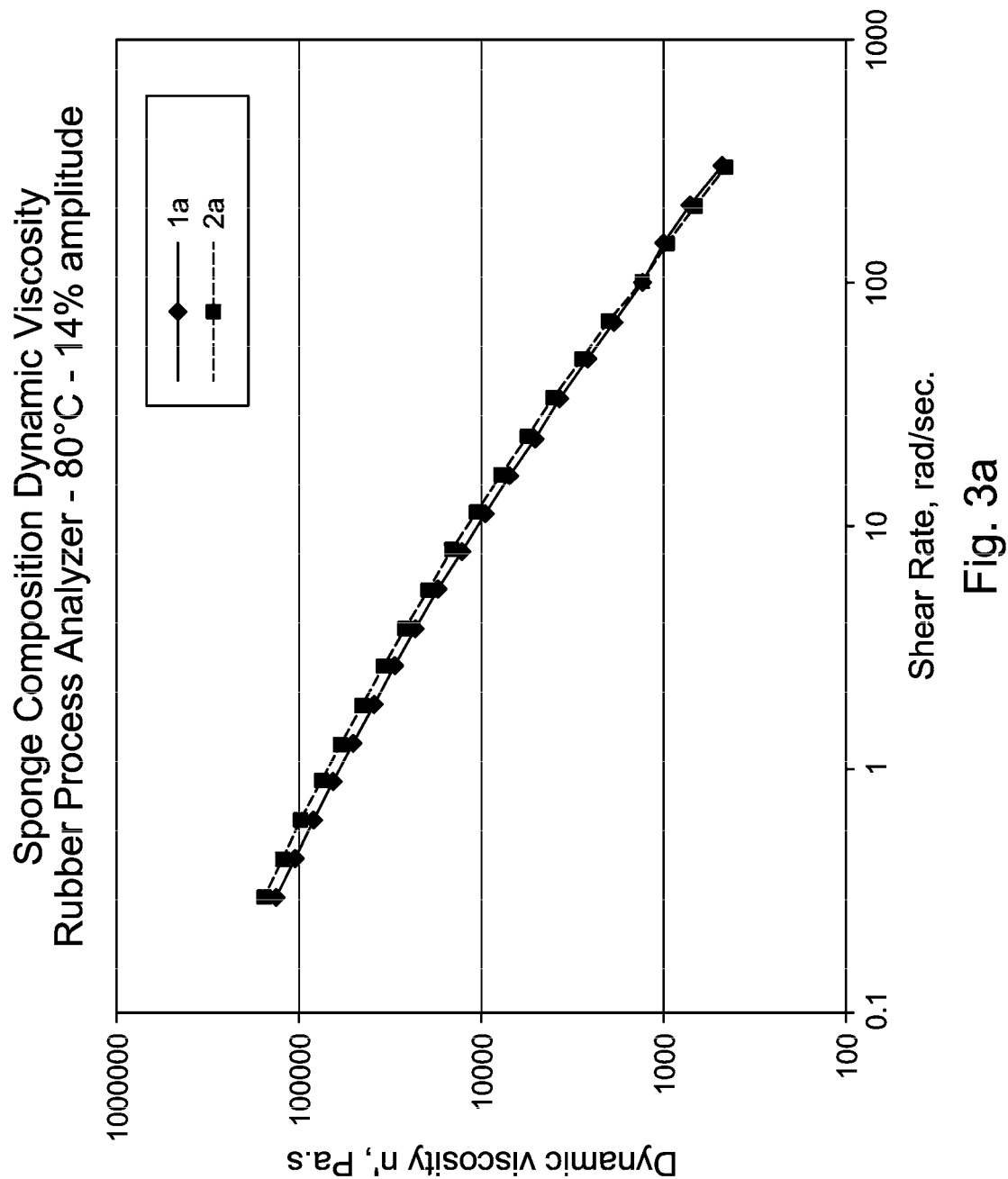
Figure 4:
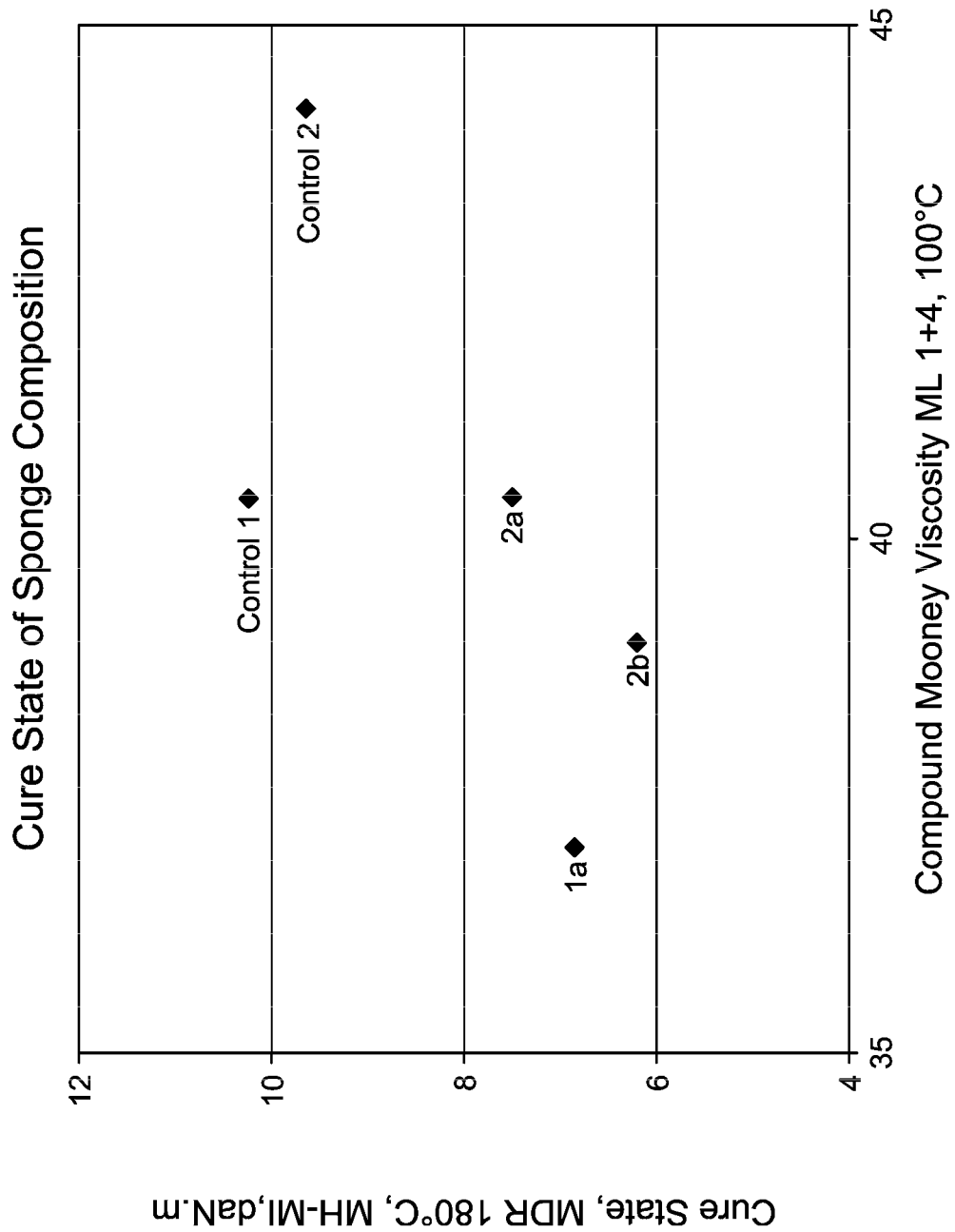
FIG. 4 depicts the cure state versus Mooney viscosity for each of the foamed sponge samples of Example 1.
Figure 5:
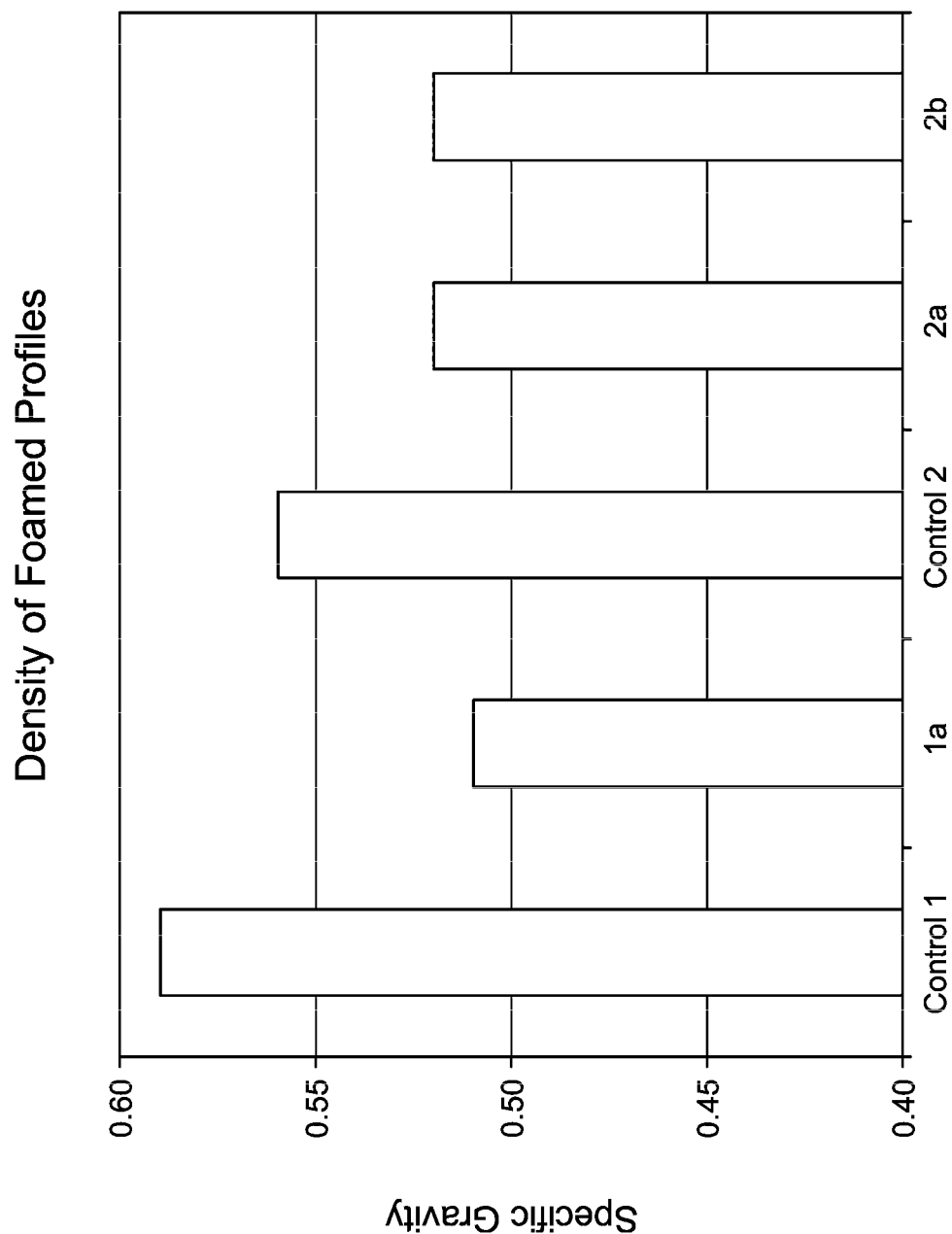
FIG. 5 depicts the density for each of the foamed profile samples of the Example 2.
Figure 6:
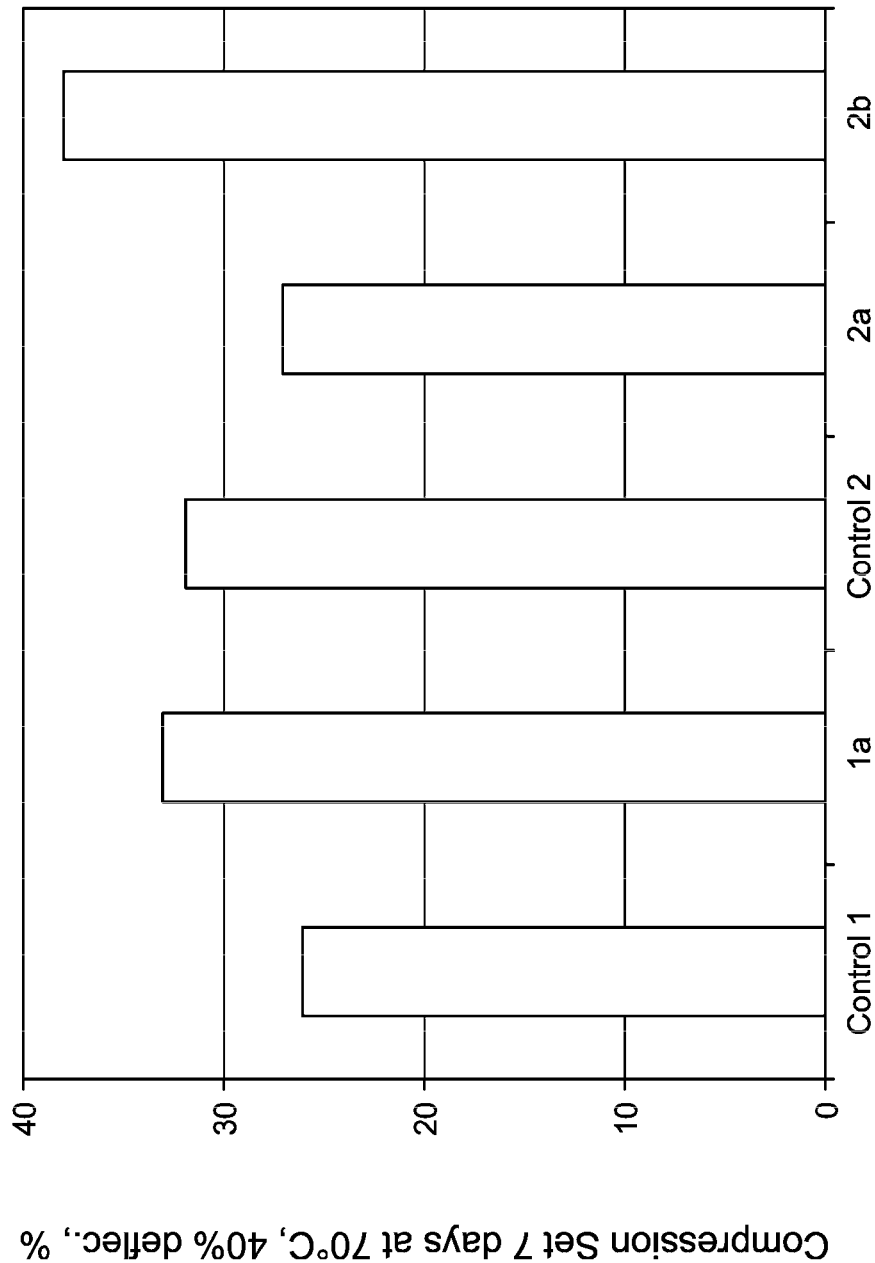
FIG. 6 depicts the compression set for each of the foamed profile samples of the Example 2.
Figure 7:
FIG. 7 depicts the compression load deflection for each of the foamed profile samples of the Example 2.
Figure 8:
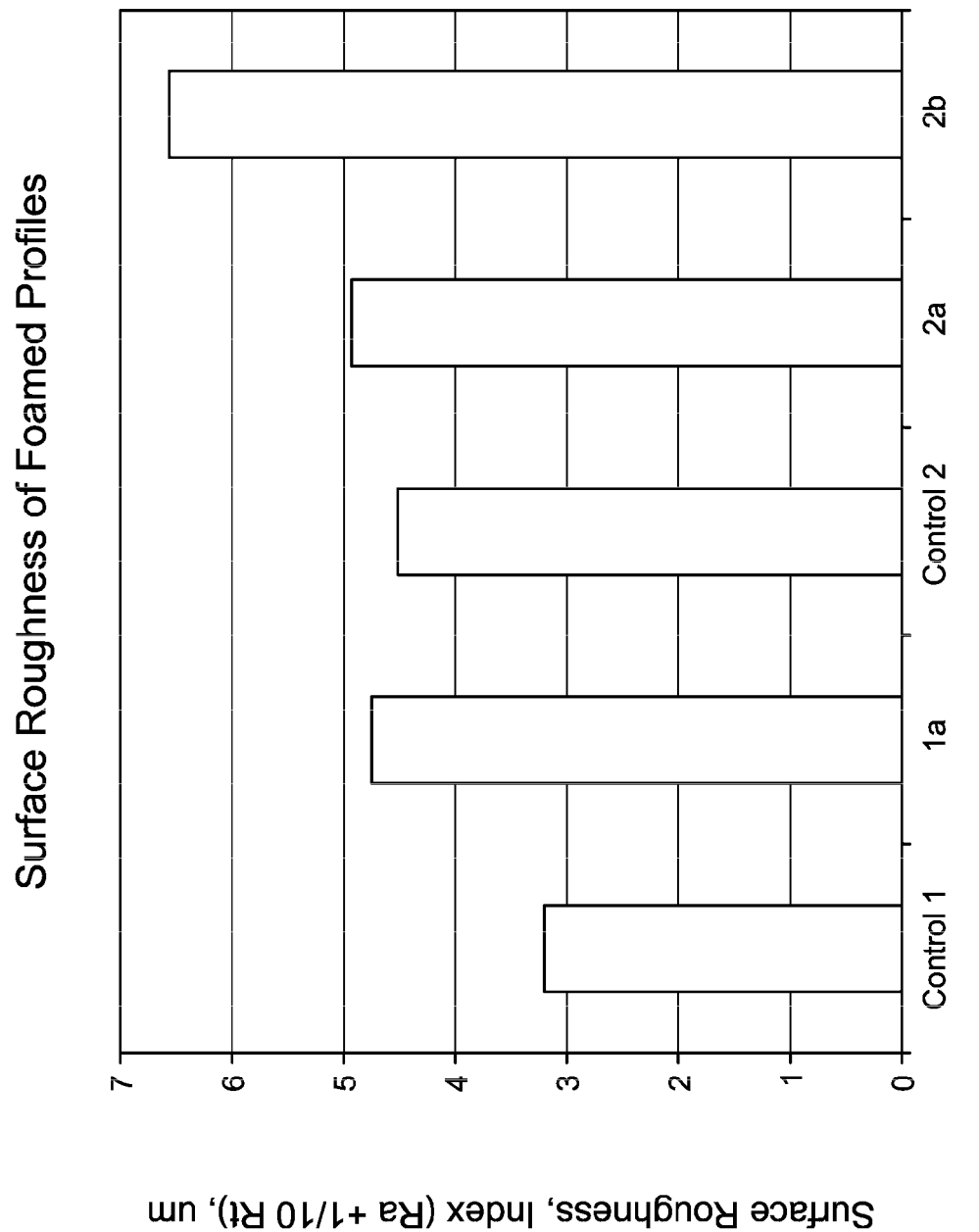
FIG. 8 depicts the Surface Roughness Index for each of the foamed profile samples of the Example 2.

It can be seen from the above data that the propylene-based elastomer reduced the viscosity and cure state of the sponge compositions. Without being bound by theory, it is believed that this is due to the fact that there are no double bonds available for a crosslinking reaction in the propylene-based elastomers used in the examples. This effect was more pronounced when the propylene-based elastomer was used in an amount of 25 phr compared to 15 phr relative to the total amount of the ethylene-propylene-diene terpolymer and the propylene-based elastomer. The dynamic viscosity and elasticity of the sponge compounds are illustrated in FIGS. 1 to 3. FIG. 1 compares Sample 1a to control Sample 1, with the dynamic viscosity illustrated in FIG. 1a and the elasticity in FIG. 1b. FIG. 2 compares Samples 2a and 2b with control Sample 2, with the dynamic viscosity illustrated in FIG. 2a and the elasticity in FIG. 2b. FIG. 3 compares Samples 1a and 2a, with the dynamic viscosity illustrated in FIG. 3a and the elasticity in FIG. 3b. The cure state of the sponge compounds are illustrated in FIG. 4.

Example 2

All compositions in Example 1 were extruded and subjected to vulcanization and foaming by the use of an extrusion line having a microwave heating (UHF) chamber and a hot air heating (HAV) chamber which were connected in series or a molding line in which a UHF chamber was not combined. The extruder head temperature was set at 80° C., the temperature of the UHF chamber was set at 200° C., and the power was controlled so that the temperature of the exit of the UHF chamber would become 180° C. As the HAV chamber, a HAV chamber of 12 m was used, and the internal temperature of the chamber was set at 250° C. The extrusion speed was set at 4 meter/minute. Property values of the thus obtained foamed profiles (referred to by the compositions from which they are made) are set forth in Table 4. Properties including density, compression set, compression load deflection, and surface roughness are illustrated in FIGS. 5 to 8.

The surface roughness was measured using a Surfcom from Mitutoyo Company which directly measures the average roughness of the profile surface with a calibrated needle.

The compression load deflection of the foamed profile was measured on a 2×10 cm length sample. The sample was compressed at room temperature to 40% of the initial height five times. The compression load deflection force reported is the value of the fifth cycle and is reported in the units of Newton/20 cm.

TABLE 4

Properties of Foamed Profiles of Example 2

| | Profile No. | | | | |
|---|---|---|---|---|---|
| | Control 1 | 1a | Control 2 | 2a | 2b |
| Specific Gravity | | | | | |
| kg/dm³ | 0.59 | 0.51 | 0.56 | 0.52 | 0.52 |
| Profile Dimensions | | | | | |
| Height, mm | 16.3 | 16.5 | 16.2 | 16.7 | 15.8 |
| Width, mm | 16.4 | 16.3 | 16.2 | 16.1 | 16.2 |
| Wall thickness, mm | 3.6 | 3.9 | 3.4 | 3.3 | 3.3 |
| Surface Roughness | | | | | |
| Ra (average), μ | 1.8 | 2.5 | 2.4 | 2.8 | 3.8 |
| Rt (peak & valley), μ | 14 | 22 | 21 | 21 | 28 |
| Ri (index), μ | 3.2 | 4.8 | 4.5 | 4.9 | 6.5 |
| Physicals | | | | | |
| Modulus 25%, MPa | 0.3 | 0.3 | 0.2 | 0.3 | 0.3 |
| Modulus 100%, MPa | 0.9 | 0.7 | 0.6 | 0.7 | 0.8 |
| Tensile Strength, MPa | 2.4 | 2.1 | 2.2 | 2.1 | 2.2 |
| Elongation at Break, % | 272 | 318 | 370 | 354 | 352 |
| Compression Set | | | | | |
| 7 days, 70° C., 40% deflection, % | 29 | 37 | 37 | 28 | 37 |
| Retest | 26 | 33 | 32 | 27 | 38 |
| Compression Load Deflection | | | | | |
| RT, 40% deflection, N/20 cm | 98 | 96 | 72 | 70 | 101 |

As shown in FIGS. 5 to 8, addition of the propylene-based elastomer reduces the density (specific gravity) of the foamed profile compositions without significantly compromising other properties such as compression set and compression load deflection. The results illustrate that the bimodal Ziegler Natta Vistalon™ 8600 EPDM rubber was more sensitive to the addition of Vistamaxx™ 6102 propylene-based elastomer than the metallocene Vistalon™ 7602 EPDM rubber in terms of changes in properties, including density, compression set, and surface roughness, which may indicate a difference in the cell morphology of the respective foamed profiles. Vistalon™ 7602, which has a narrow MWD, is likely to demonstrate a better compatibility with Vistamaxx™ 6102 propylene-based elastomer, which shares more similarity in molecular structure with that of Vistalon™ 7602 EPDM rubber than with that of Vistalon™ 8600 EPDM rubber. This may also explain the retention of the original compression set performance observed in a composition comprising no more than 15 phr of Vistamaxx™ 6102 propylene-based elastomer.

All documents described herein are incorporated by reference herein, including any priority documents and/or testing procedures. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A foamed profile formed from a composition comprising:
   (a) an ethylene-propylene-diene terpolymer having a Mooney viscosity [ML(1+4) at 125° C.] of about 25 to about 300 and having an ethylene content of from about 50 wt % to about 90 wt % and a diene content of about 5 wt % to about 15 wt %, based on the weight of the ethylene-propylene-diene terpolymer;
   (b) a propylene-based elastomer having at least about 60 wt % propylene-derived units and about 5 to about 25 wt % ethylene-derived units, based on total weight of the propylene-based elastomer, and a heat of fusion of less than about 80 J/g;
   (c) from about 50 phr to about 150 phr of one or more fillers relative to the total amount of ethylene-propylene-diene terpolymer and propylene-based elastomer in the composition; and
   (d) a foaming agent;
   wherein the foamed profile is formed in a manner such that the composition is vulcanized while being foamed, and further wherein the foamed profile has a density (ASTM D792-08, 23° C.) at least about 5% lower than the density of a comparative foamed profile formed from a comparative composition free of the propylene-based elastomer but which is otherwise identical in terms of its constituents.

2. The foamed profile of claim 1, wherein the ethylene-propylene-diene terpolymer has a Mooney viscosity [ML(1+4) 125° C.] of about 60 to about 100, an ethylene content of from about 50 wt % to about 60 wt %, and a diene content of about 5 wt % to about 10 wt %, based on total weight of the ethylene-propylene-diene terpolymer.

3. The foamed profile of claim 1, wherein the propylene-based elastomer is present in an amount of less than or equal to about 20 phr relative to the total of the ethylene-propylene-diene terpolymer and the propylene-based elastomer.

4. The foamed profile of claim 1, wherein the foaming agent is present in an amount of less than or equal to about 25 phr relative to the total of the ethylene-propylene-diene terpolymer and the propylene-based elastomer.

5. The foamed profile of claim 1, wherein the foaming agent comprises at least one of 4,4'-oxybis benzene sulfonyl hydrazide, azodicarbonamide, azobisformamide, azobisisobutyronitrile, diazoaminobenzene, N,N-dimethyl-N,N-dinitro so terephthalamide, N,N-dinitro sopentamethylenetetramine, benzenesulfonyl-hydrazide, benzene-1,3-disulfonyl hydrazide; diphenylsulfon-3-3, disulfonyl hydrazide, p-toluene sulfonyl semicarbizide, barium azodicarboxylate, butylamine nitrile, nitroureas, trihydrazino triazine, phenyl-methyl-uranthan, p-sulfonhydrazide, and peroxides.

6. The foamed profile of claim 1, wherein the composition further comprises at least one of a processing aid, a curing agent, and an accelerator.

7. A foamed profile formed from a composition comprising:
   (a) an ethylene-propylene-diene terpolymer having a Mooney viscosity [ML(1+4) 125° C.] of about 60 to about 100, an ethylene content of about 50 to about 60 wt %, and a diene content of about 7 to about 10 wt %, based on total weight of the ethylene-propylene-diene terpolymer;
   (b) a propylene-based elastomer in an amount of about 10 phr to about 15 phr relative to the total of the ethylene-propylene-diene terpolymer and the propylene-based elastomer, having at least about 60 wt % propylene-derived units and about 10 to about 20 wt % ethylene-derived units, based on total weight of the propylene-based elastomer, and a heat of fusion of less than about 80 J/g;

(c) from about 50 phr to about 150 phr of one or more fillers relative to the total amount of ethylene-propylene-diene terpolymer and propylene-based elastomer in the composition; and
(d) a foaming agent in an amount of about 0.5 phr to about 6 phr relative to the total of the ethylene-propylene-diene terpolymer and the propylene-based elastomer
wherein the foamed profile is formed in a manner such that the composition is vulcanized while being foamed, and further wherein the foamed profile has a density (ASTM D792-08, 23° C.) at least about 5% lower than the density of a comparative foamed profile formed from a comparative composition free of the propylene-based elastomer but which is otherwise identical in terms of its constituents.

8. The foamed profile of claim 7, wherein the foaming agent comprises at least one of 4,4'-oxybis benzene sulfonyl hydrazide, azodicarbonamide, azobisformamide, azobisisobutyronitrile, diazoaminobenzene, N,N-dimethyl-N,N-dinitro so terephthalamide, N,N-dinitro sopentamethylene-tetramine, benzenesulfonyl-hydrazide, benzene-1,3-disulfonyl hydrazide; diphenylsulfon-3-3, disulfonyl hydrazide, p-toluene sulfonyl semicarbizide, barium azodicarboxylate, butylamine nitrile, nitroureas, trihydrazino triazine, phenyl-methyl-uranthan, p-sulfonhydrazide, and peroxides.

9. The foamed profile of claim 7, wherein the foaming agent comprises 4,4'-oxybis benzene sulfonyl hydrazide.

10. A method for preparing a foamed profile, comprising the steps of:
(a) forming a composition comprising (i) an ethylene-propylene-diene terpolymer having a Mooney viscosity [ML(1+4) at 125° C.] of about 25 to about 300 and having an ethylene content of from about 50 wt % to about 90 wt % and a diene content of form about 5 wt % to about 15 wt %, based on the weight of the ethylene-propylene-diene terpolymer; (ii) a propylene-based elastomer having at least about 60 wt % propylene-derived units and about 5 to about 25 wt % ethylene-derived units, based on total weight of the propylene-based elastomer, and a heat of fusion of less than about 80 J/g; (iii) filler, and (iv) a foaming agent; and
(b) extruding and heating the composition so as to vulcanize the composition while it is being foamed;
wherein the foamed profile has a density (ASTM D792-08, 23° C.) at least about 5% lower than the density of a comparative foamed profile formed from a comparative composition free of the propylene-based elastomer but which is otherwise identical to said composition in (a) in terms of its constituents.

11. The foamed profile of claim 1, wherein the foamed profile was formed at least in part by extruding the composition.

12. The foamed profile of claim 1, having at least one of the following properties: (i) a compression load deflection (room temperature, 40% deflection) at most about 5% lower, and (ii) a compression set (7 days, 70° C., 40% deflection) at most about 30% higher, than that of a foamed profile comprising a composition free of the propylene-based elastomer but which is otherwise identical in terms of its constituents.

13. A seal article comprising the foamed profile of claim 1.

14. A method for reducing the density of a foamed profile, comprising the steps of:
(a) combining (i) an ethylene-propylene-diene terpolymer having a Mooney viscosity [ML(1+4) at 125° C.] of about 25 to about 300 and having an ethylene content of from about 50 wt % to about 90 wt % and a diene content of form about 5 wt % to about 15 wt %, based on the weight of the ethylene-propylene-diene terpolymer; (ii) a propylene-based elastomer having at least about 60 wt % propylene-derived units and about 5 to about 25 wt % ethylene-derived units, based on total weight of the propylene-based elastomer, and a heat of fusion of less than about 80 J/g; (iii) from about 50 phr to about 150 phr of one or more fillers relative to the total amount of ethylene-propylene-diene terpolymer and propylene-based elastomer; and (iv) a foaming agent to form a composition; and
(b) forming a foamed profile from the composition in (a) in a manner such that the composition is vulcanized while being foamed, wherein the foamed profile has a density (ASTM D792-08, 23° C.) at least about 5% lower than the density of a comparative foamed profile formed from a comparative composition free of the propylene-based elastomer but which is otherwise identical to the composition in (a) in terms of its constituents.

* * * * *